US006904994B2

(12) United States Patent
Coutant et al.

(10) Patent No.: US 6,904,994 B2
(45) Date of Patent: Jun. 14, 2005

(54) HORIZONTAL TRANSMISSION AND OIL SYSTEM FOR TELEHANDLERS

(75) Inventors: Alan R. Coutant, Peoria, IL (US); Steven A. Daniel, East Peoria, IL (US); Alan J. Griffiths, Wolverhampton (GB); Liam W. Keane, Apex, NC (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/101,668

(22) Filed: Mar. 19, 2002

(65) Prior Publication Data

US 2003/0094325 A1 May 22, 2003

Related U.S. Application Data

(60) Provisional application No. 60/332,845, filed on Nov. 16, 2001.

(51) Int. Cl.[7] .................................................. B60K 8/00
(52) U.S. Cl. ...................................... 180/291; 180/374
(58) Field of Search .......................... 280/781; 180/291, 180/292, 337, 374–377; 414/685, 680; 123/41.47, 41.49

(56) References Cited

U.S. PATENT DOCUMENTS

| 2,871,724 | A |   | 2/1959  | Dence ........................... 74/665 |
| 3,331,464 | A |   | 7/1967  | Van Doorne .................. 180/44 |
| 3,677,358 | A | * | 7/1972  | Luft .............................. 180/233 |
| 3,865,205 | A | * | 2/1975  | Swanson ....................... 180/12 |
| 3,865,209 | A | * | 2/1975  | Aihara et al. ............... 180/65.4 |
| 3,894,603 | A | * | 7/1975  | Winzeler .................... 180/53.1 |
| 4,186,811 | A | * | 2/1980  | Bidon ......................... 180/6.48 |
| 4,274,505 | A | * | 6/1981  | Maust .......................... 180/215 |
| 4,484,656 | A | * | 11/1984 | Bird ............................. 181/114 |
| 4,618,022 | A |   | 10/1986 | Hayashi ....................... 180/244 |
| 4,805,720 | A |   | 2/1989  | Clenet ......................... 180/248 |
| 5,099,945 | A | * | 3/1992  | Okui et al. .................. 180/297 |
| 5,120,187 | A |   | 6/1992  | Weber ......................... 414/694 |
| 5,595,398 | A |   | 1/1997  | Brown ...................... 280/763.1 |
| 5,618,156 | A |   | 4/1997  | Brown ......................... 414/694 |
| 5,687,809 | A |   | 11/1997 | Braud ......................... 180/297 |
| 5,836,733 | A |   | 11/1998 | Moses et al. ............... 414/685 |
| 5,931,255 | A |   | 8/1999  | Sewell ........................ 180/374 |
| 6,071,066 | A |   | 6/2000  | Braud ......................... 414/686 |
| 6,079,937 | A |   | 6/2000  | Cook .......................... 414/680 |
| 6,105,710 | A |   | 8/2000  | Vandepitte .................. 180/376 |
| 6,152,253 | A |   | 11/2000 | Monaghan ................... 180/291 |
| 6,205,665 | B1 | * | 3/2001  | Anderson et al. .......... 29/897.2 |
| 6,382,899 | B1 | * | 5/2002  | Cook .......................... 414/685 |
| 6,514,031 | B1 | * | 2/2003  | Cook .......................... 414/685 |
| 6,554,558 | B2 | * | 4/2003  | Knight ........................ 414/685 |
| 2002/0053480 | A1 |  | 5/2002  | Pack |

FOREIGN PATENT DOCUMENTS

| EP | 0577388 A  | 1/1994  |
| EP | 1028019 A2 | 8/2000  |
| EP | 1084986    | 3/2001  |
| GB | 976049     | 11/1964 |

* cited by examiner

*Primary Examiner*—Lesley D. Morris
*Assistant Examiner*—L. Lum
(74) *Attorney, Agent, or Firm*—Diana L Charlton

(57) ABSTRACT

A power train arrangement having a prime mover and a transmission coupled to the prime mover for driving a cooling system with the prime mover through the transmission. The transmission is positioned intermediate to the prime mover and the cooling system in a manner to optimize the mechanical and functional operation of the work machine.

33 Claims, 9 Drawing Sheets

HORIZONTAL TRANSMISSION AND OIL SYSTEM FOR TELEHANDLERS

This application claims the benefit of prior provisional patent application Ser. No. 60/332,845, filed Nov. 16, 2001.

TECHNICAL FIELD

This invention relates to a power train arrangement, and more particularly to a power train arrangement for work machines, such as material handling machines.

BACKGROUND

Work machines such as material handling machines for use at construction sites typically have large diameter front and rear wheels driven by a power train. These material handling machines are designed to carry out given tasks such as digging, loading, or pallet-lifting. The relatively large wheels place a constraint on the arrangement of the machine's power train components and operator's cabin.

One known material handling machine for use at construction sites is a telescopic handler. This machine has an elongated main frame defined by first and second substantially parallel and vertically oriented side members that are spaced apart to form a longitudinally extending gap centered about a longitudinal vertical center plane of the material handling machine. A boom is pivotally connected at one end of the boom to a back end portion of the main frame and extends parallel to the center plane of the material handling machine so that a second end of the boom passes a front end portion of the main frame. The boom may have an implement mounted at its second end for performing an intended work function. An operator's cabin is typically located to one side of the boom, while the engine, cooling system, and transmission are located to a second side of the boom. The above configuration generally provides good operator visibility in all directions, except the direction in which the engine, cooling system, and transmission obstruct the operator's visibility.

In the known material handling machine, such as the telescopic handler described above, the cooling system, engine, and transmission are mounted serially in that order to the main frame. That is, the engine is disposed between the transmission and the cooling system. In the case of a four wheel drive system, the material handling machine further includes front and rear axles mounted beneath the main frame to complete the power train to wheels that are carried by the front and rear axles. A front differential couples the front axle to a first drive shaft, and a rear differential couples the rear axle to a second drive shaft. Both first and second drive shafts extend longitudinally beneath the longitudinally extending gap formed by the side members of the main frame. Hydraulically actuated piston-cylinder devices may be used to steer the wheels.

Since the engine is arranged outside the longitudinal vertical center plane of the material handling machine and is elevated with respect to the machine's differentials, the transmission, which can include a reducing transmission, is required to overcome significant vertical and lateral distances in order to transmit torque from the engine to the differentials. As a result, severe drive shaft angles are created that can cause vibration and wear in the power train. Additionally, the larger the material handling machine, the more severe the drive shaft angles can be, since the main frames are wider on the larger machines. Therefore, different cooling system, engine, and transmission designs are required for different size machines to adapt to the different sizes of the main frames.

Furthermore, since the engine is arranged between the transmission and cooling system, the weight of the engine cannot be effectively used as a counter weight against a load at the front end of the material handling machine, such as a load carried by the boom in the case of a telescopic handler.

For example, U.S. Pat. No. 6,105,710 discloses a material handling machine in which an engine is arranged outside the longitudinal center plane of the machine, and a transmission is coupled to one end of the engine through a torque converter at one end of the engine opposite to where the cooling system is connected. The transmission includes a reducing transmission coupled to an output shaft of the engine for reducing the number of revolutions of the engine's output shaft, and a transfer transmission that takes an output torque from the reducing transmission and transmits this torque to the drive shafts.

Since the transmission disclosed in U.S. Pat. No. 6,105,710 is coupled to one end of the engine at a side of the engine opposite to where the cooling system is connected, the transmission is coupled to the drive shafts at a position off-center with respect to the front and rear differentials. Consequently, one of the drive shafts is shorter than the other, resulting in a severe drive shaft angle for at least the shorter shaft. Furthermore, since the engine is disposed forward of the transmission, the engine's weight cannot be effectively used as a counter weight against a load at the front end of the material handling machine, such as a load carried by the boom in the case of a telescopic handler.

Additionally, U.S. Pat. No. 6,152,253 discloses a drive train arrangement for a construction vehicle wherein a side frame member extends laterally from a central frame member of the vehicle and defines a drive train receiving space for an engine, transmission and transfer case. The engine and transmission are oriented in a side-by-side configuration and connected via the transfer case such that the transmission input and output extend along an axis coincident with the longitudinal axis of the central frame member.

Due to the positioning of the transmission along an axis coincident with the longitudinal axis of the central frame member, the transfer case is disposed in a manner that laterally offsets the engine and the transmission. The positioning of the drive train components in this manner limits loading and spacing advantages available on the vehicle and ignores valuable and efficient connecting relationships between the components.

The present invention is directed to overcoming one or more of the problems as set forth above.

SUMMARY OF THE INVENTION

It would, therefore, be desirable to provide a work machine that can carry out operations, such as lifting, loading, and digging, and in which essential components, including the engine and transmission, are arranged to optimize the mechanical and functional operation of the machine.

In one aspect of the present invention, a power train arrangement, comprises a prime mover, a cooling system; and a transmission coupled to the prime mover and the cooling system with the transmission positioned intermediate the prime mover and the cooling system.

According to another aspect of the present invention, a work machine has front and rear ends and a main frame. A prime mover, transmission and cooling system are connected to a platform to define a module releasably connected to the main frame. The prime mover, transmission and cooling system are interconnected in a predetermined manner so that the prime mover is positioned rearwardly from the transmission and the cooling system in relation to the front end of the work machine. The work machine also includes front and rear wheels. A front drive shaft is coupled to the transmission for transmitting a first torque to the front wheel and has a predetermined length. A rear drive shaft is coupled to the transmission for transmitting a second torque to the rear wheel and has a predetermined length equal to the predetermined length of the front drive shaft.

According to yet another aspect of the present invention, a method of manufacturing a plurality of work machines is disclosed that includes a first work machine that has a first main frame and a second work machine that has a second main frame with the second main frame being larger than the first main frame. The method comprises the steps of providing two prime movers, two transmissions, two cooling systems, and two platforms. Then, assembling a first module and a second module so that each of the first and second modules include one of the two prime movers, one of the two transmissions, and one of the two cooling systems respectively mounted to one of the two platforms. Next, coupling the transmission of each of the first and second modules to the respective prime mover and respective cooling system in a manner that disposes the transmission intermediate to the prime mover and the cooling system. Finally, mounting the first module to the first main frame and mounting the second module to the second main frame.

The present invention provides a work machine that can carry out operations, such as lifting, loading, and digging, with essential components, including the engine, transmission and cooling system arranged in a manner to optimize the mechanical and functional operation of the work machine.

BRIEF DESCRIPTION OF THE DRAWINGS

The above-mentioned and other features and advantages of this invention are described below with reference to the accompanying drawings, wherein.

DETAILED DESCRIPTION

Figure 1:
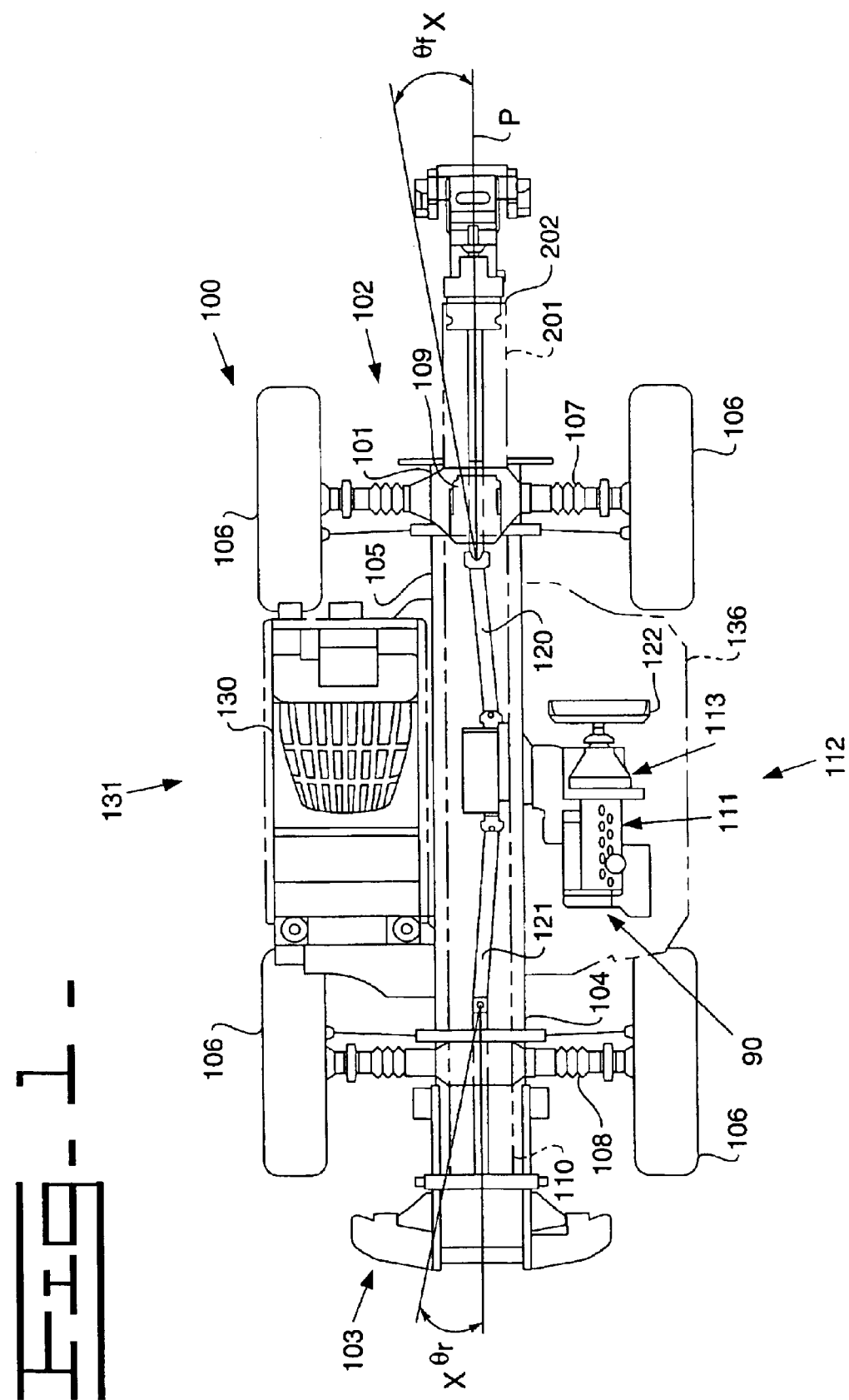
FIG. 1 is a top view of a work machine in accordance with the present invention.

While the invention is open to various modifications and alternative forms, a specific embodiment thereof has been shown by way of example in the drawings and will herein be described in detail. There is no intent to limit the invention to the particular form disclosed.

Figure 2:
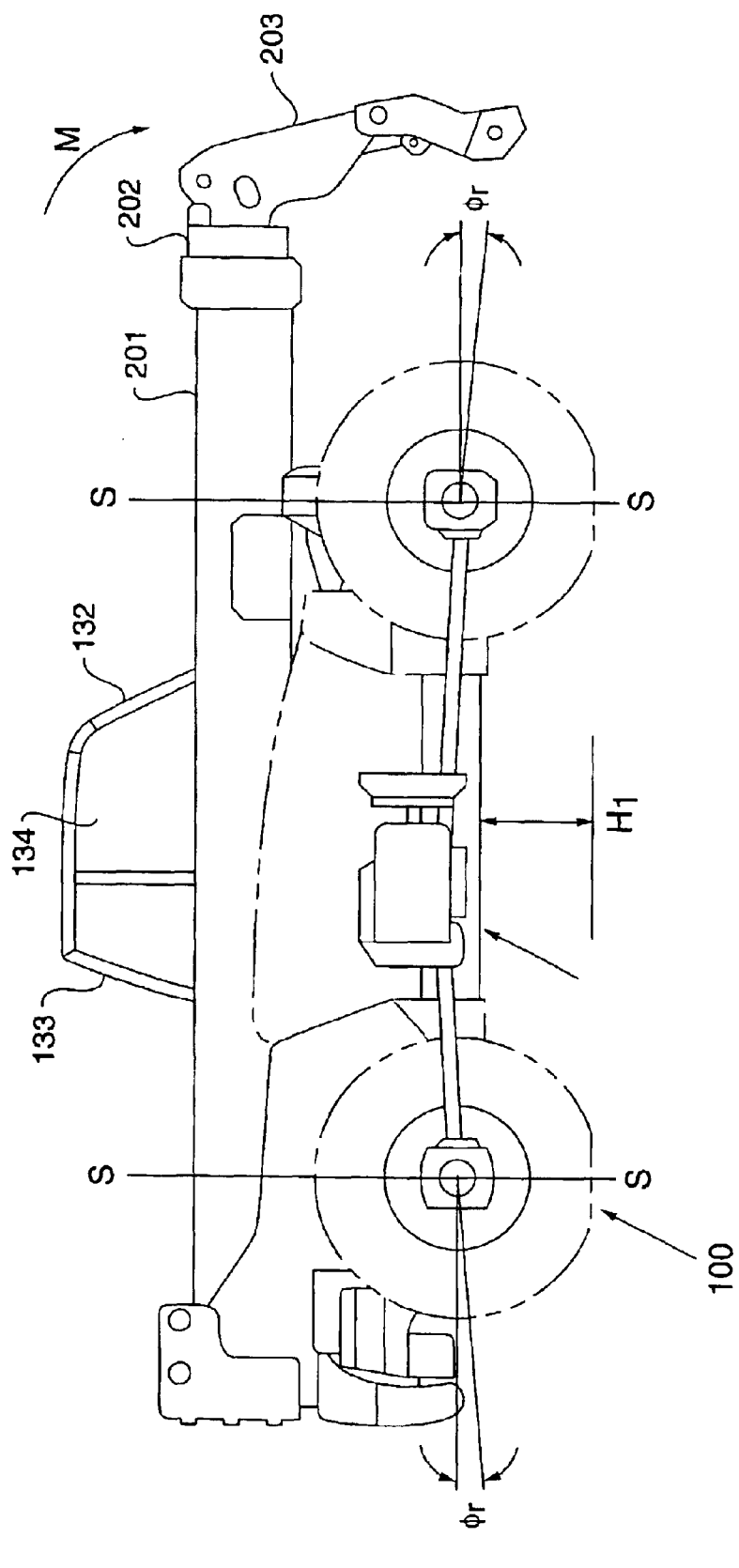
FIG. 2 is a side view of the work machine in accordance with the present invention.
Figure 3:
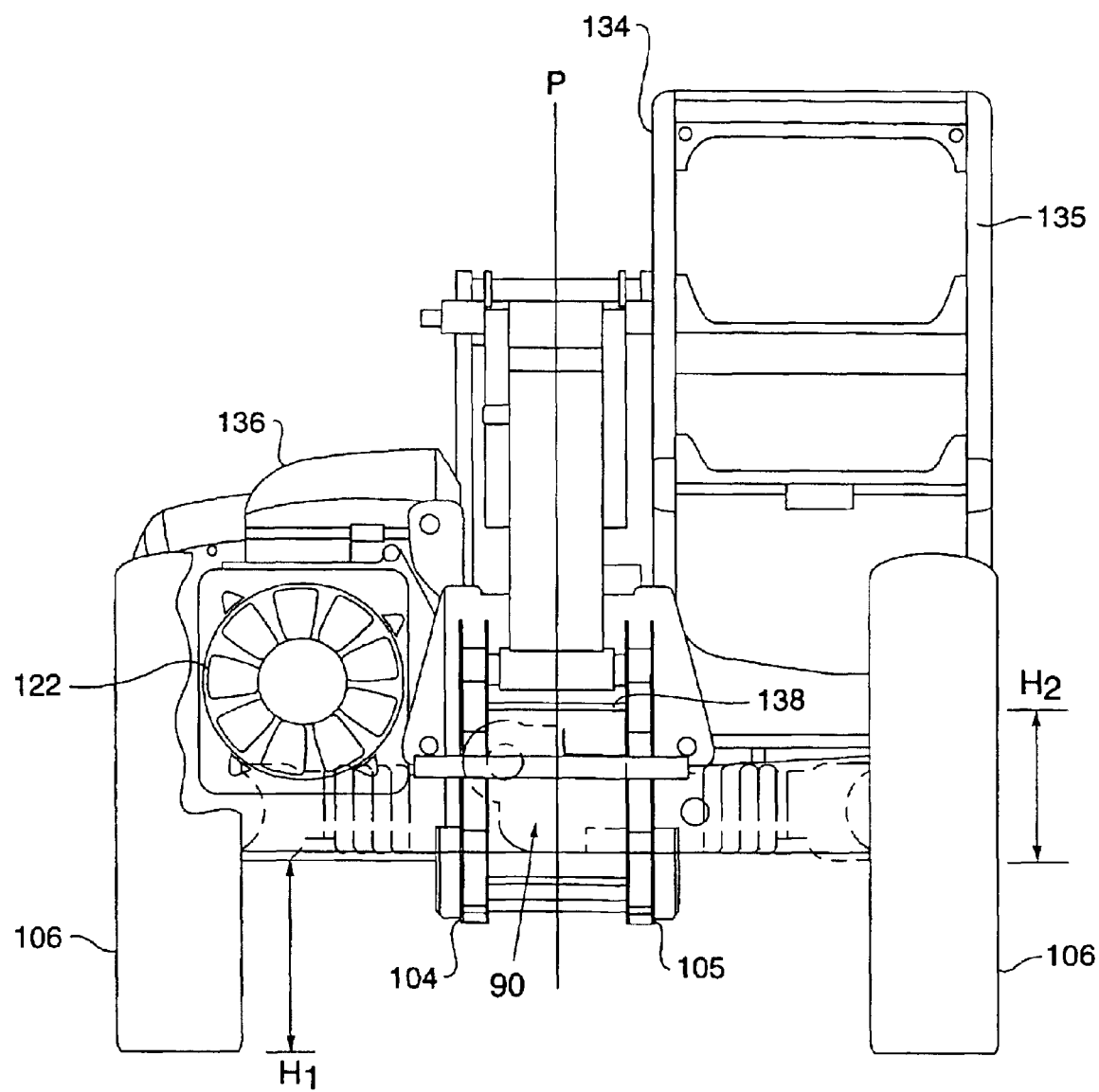
FIG. 3 is a front view of the work machine in accordance with the present invention.

Referring to FIGS. 1–3, a power train arrangement for a work machine 100, according to an embodiment of the invention, is indicated generally at 90. The work machine 100 includes a chassis or main frame 101 having a front end 102 and a rear end 103 with a longitudinal axis X—X extending between the front end 102 and the rear end 103 and passing through a longitudinal vertical center plane P of the work machine 100. The main frame 101 has an elongated configuration defined by first and second substantially parallel and spaced apart side members 104, 105, which are oriented vertically.

Seen specifically in FIGS. 1 and 2, the work machine 100 is a telescopic handler having a telescopic boom 201 that is pivotally connected to the main frame 101 at the rear end 103. While the present invention is described with reference to a telescopic handler, other work machines, such as loaders, backhoes, non-telescopic handlers and the like are within the scope of the invention.

An extremity or distal end 202 of the boom 201 can be fitted with an attachment, such as a pallet lifting fork or the like. For proper balancing of the work machine 100, the longitudinal centerline of the boom 201 lies in the longitudinal vertical center plane P of the work machine. Within this plane P, the boom 201 can be raised and lowered, as well as extended and shortened, by hydraulic cylinders and pistons (not shown), as is well known. As a result of this arrangement, for any given material load, the work machine 100 experiences the greatest moment force M that urges the work machine 100 about its front end 102 when the boom 201 is filly extended. Therefore, proper distribution of the work machine's weight along the longitudinal axis X—X is important for maximizing the load carrying capability of the work machine 100 and ensuring that the work machine 100 is stable at maximum carrying loads.

In order to traverse uneven terrain, the work machine 100 is equipped with large front and rear wheels 106, which are rotatably supported on respective front and rear axles 107, 108. The front and rear axles 107, 108 are connected to the main frame 101 near the front and rear ends 102, 103 of the main frame 101, respectively, and extend transversely relative to the longitudinal axis X—X of the main frame 101. The large front and rear wheels 106 limit the available space for other essential components of the work machine 100. Seen specifically in FIG. 2, both the front and rear wheels 106 can be pivotable about a respective vertical steering axis S—S for steering the work machine 100, further limiting the available space in which to arrange other essential components of the work machine 100.

Referring again to FIG. 1, the front and rear axles 107, 108 are provided with respective front and rear differentials 109, 110, which are also preferably located in the longitudinal vertical center plane P of the work machine 100. A front drive shaft 120 leads to the front differential 109 for driving that differential. Similarly, a rear drive shaft 121 leads to the rear differential 110 for driving that differential. As discussed further below, the front and rear drive shafts 120, 121 may lie in the longitudinal center plane P of work machine 100 and may be co-linear with respect to each other. Alternatively, these drive shafts may be angled with respect to the longitudinal vertical center plane P and/or with respect to each other as shown in FIG. 1. In the case where the front and rear drive shafts 120, 121 are angled with respect to the longitudinal vertical center plane P and/or with respect to each other, it is preferable to minimize the drive shaft angles $\theta_f$, $\theta_r$, $\phi_f$, $\phi_r$.

Figure 4:
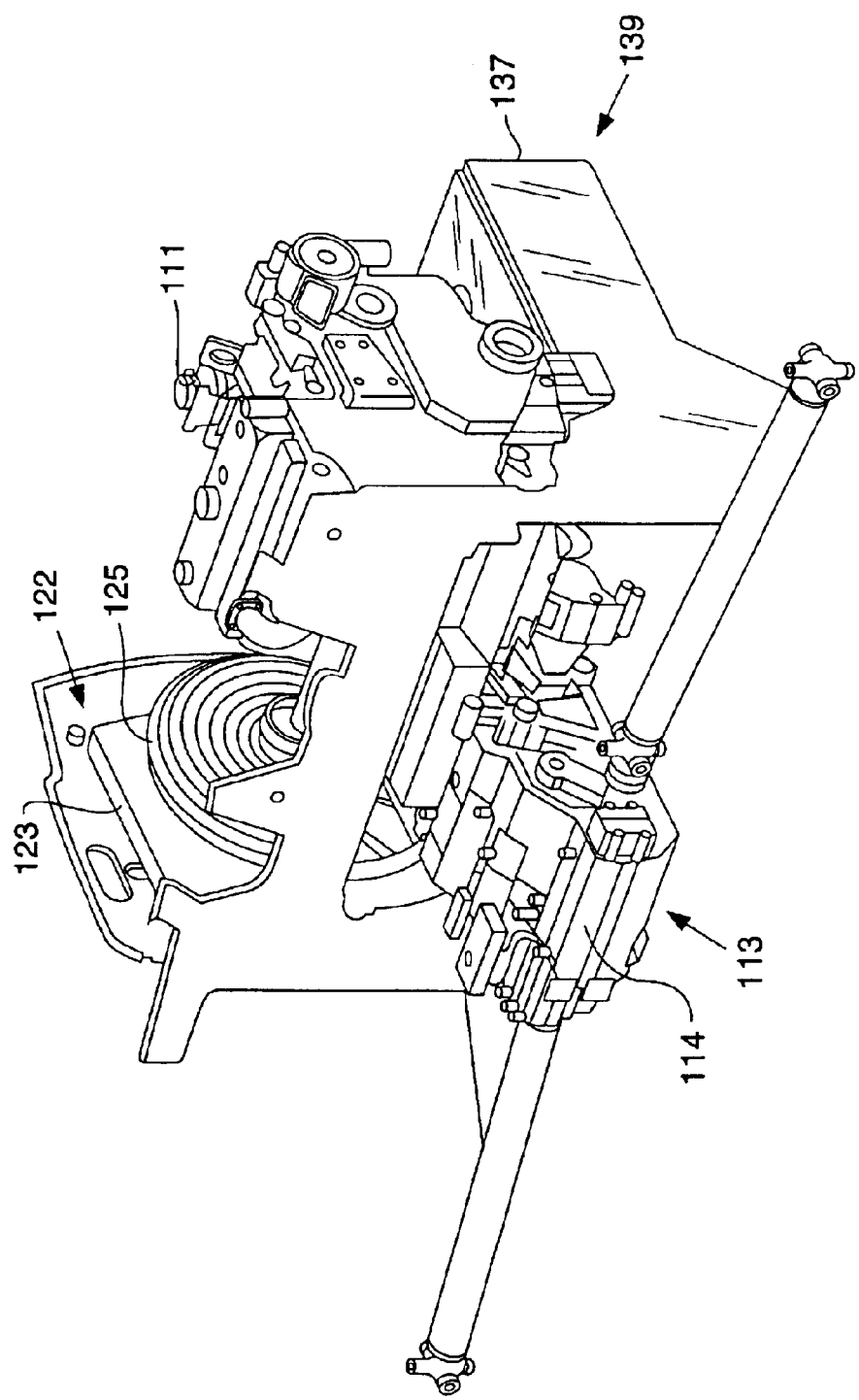
FIG. 4 is a perspective view of a prime mover, transmission, cooling system, and front and rear drive shafts in accordance with the present invention.
Figure 5:
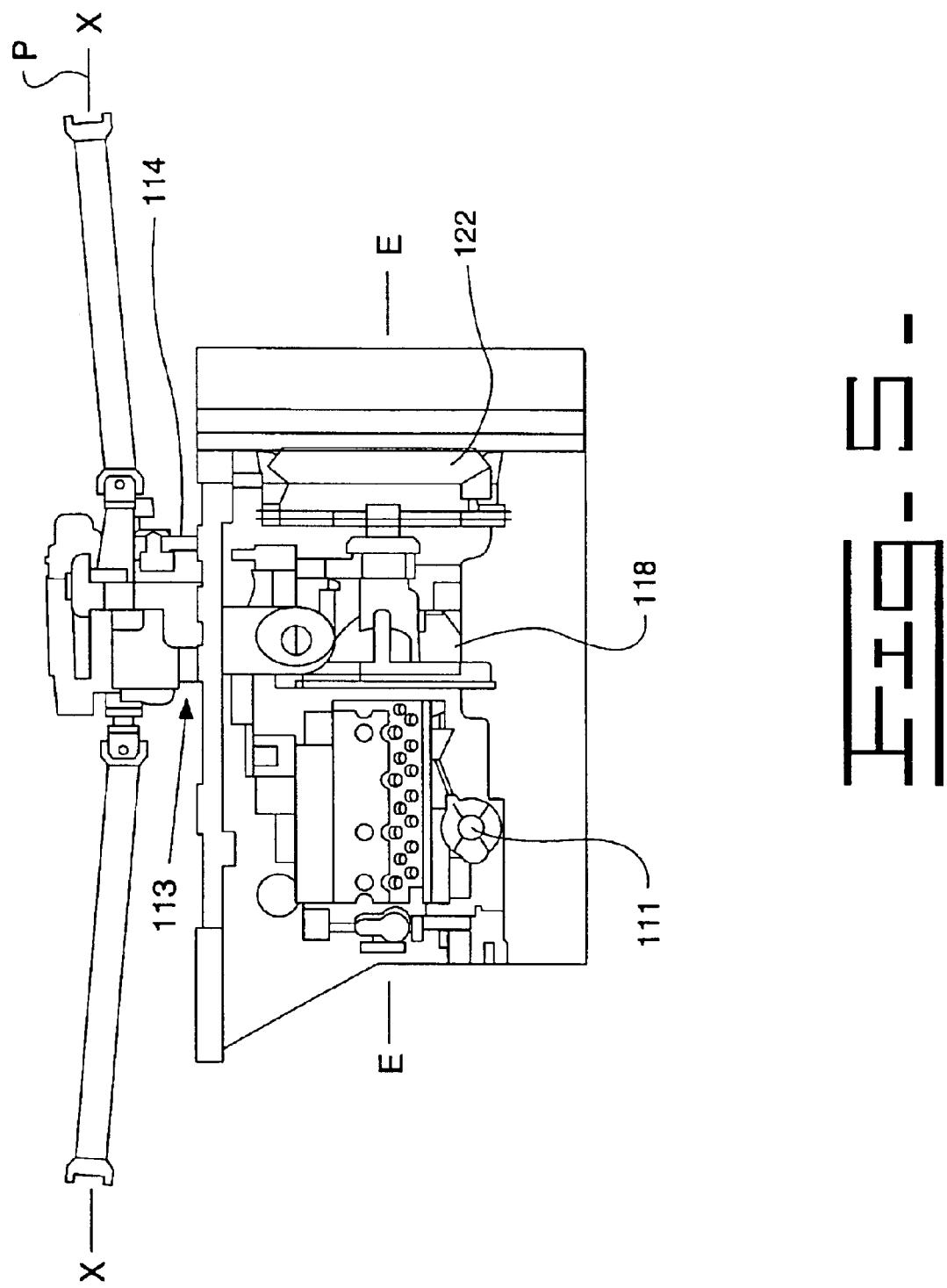
FIG. 5 is a top view the prime mover, transmission, cooling system, and front and rear drive shafts in accordance with an the present invention.

Referring to FIGS. 1, and 4–5, the work machine 100 has a prime mover 111, for example a heat engine such as a compression ignition or diesel engine, for generating the required torque to move the work machine 100 as well as power to operate various auxiliary components of the work machine 100, including hydraulics pumps for actuating the hydraulic pistons and cylinders (not shown). According to this embodiment, the prime mover 111 is upright and located to a first side 112 of the main frame 101. Seen specifically in FIG. 4, the prime mover is preferably fixed to a platform 137 that is attached to the main frame 101 in any suitable manner, preferably, releasably mounted via a plurality of bolts (not shown). The longitudinal centerline E—E of the prime mover 111 may be set at an angle with respect to the longitudinal axis X—X of the main frame 101, but is preferably parallel to the longitudinal axis X—X as shown in FIG. 5.

Figure 8:
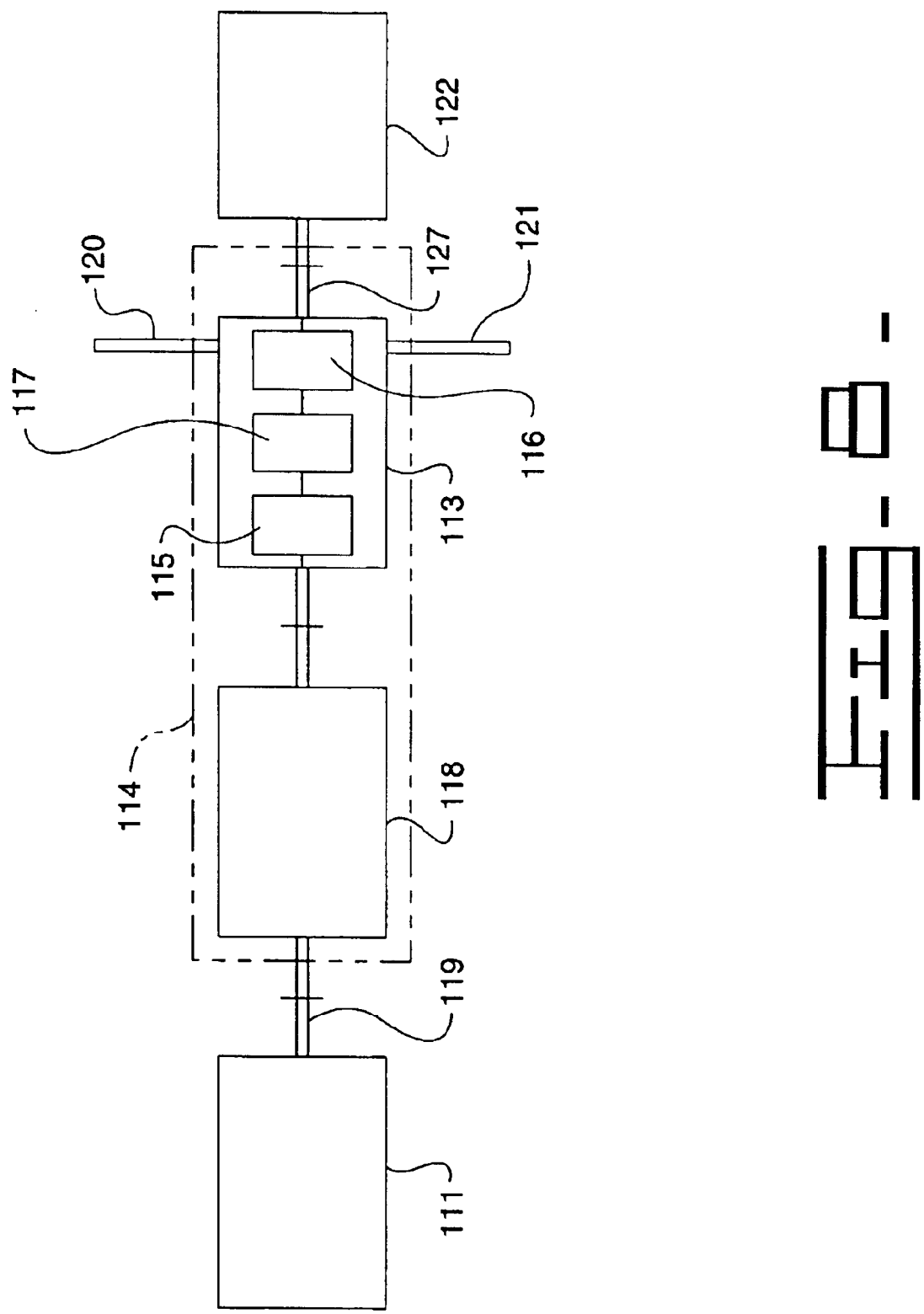
FIG. 8 is a block diagram of the prime mover, transmission, cooling system, and front and rear drive shafts in accordance with the present invention.

Referring to FIGS. 1 and 4–6, the work machine 100 has a transmission 113 for transmitting torque from the prime mover 111 to the wheels 106. As shown in FIG. 4, the transmission 113 is also preferably fixed to the platform 137 that is attached to the main frame 101. The transmission 113 includes a housing 114 that houses an input gear assembly 115 and an output gear assembly 116, and may also include an intermediate gear assembly 117, as seen best in FIG. 6. The housing 114 is rigidly coupled to the prime mover 111 at one end, for example, the front end of the prime mover as shown in FIG. 5. In the case of an automatic transmission, seen best in FIGS. 5–6 and 8, the transmission 113 includes a torque converter 118 coupled thereto, also disposed within the housing 114, to provide a fluid coupling between an output shaft 119 of the prime mover 111 and the input gear assembly 115 of the transmission 113. While the present invention is described with respect to an automatic transmission, other transmissions, such as simple or compound mechanical change-gear transmissions that can be shifted using manual, semiautomatic, or fully automatic actuators to select one of a number of gear ratios between an input shaft and an output shaft of the transmission are within the scope of the present invention.

The input gear assembly 115 of the transmission 113 is rotatable in response to rotation of the output shaft 119 of the prime mover 111, such as a crankshaft, through the torque converter 118. Seen specifically in FIG. 6, the rotational axes of the transmission's input, output and intermediate gear assemblies 115–117 are set to be preferably parallel to the rotational axis of the output shaft 119 of the prime mover 111, which, in turn, is preferably parallel to the longitudinal axis X—X of the main frame 101. This parallel alignment reduces the complexity of the transmission 113, since it eliminates the requirement for beveled gears to compensate for any offset angle between the transmission 113 and the prime mover 111 and/or the front and rear drive shafts 120, 121. However, it should be understood that the rotational axis of the input gear assembly 115 may be preferably coaxial with the rotational axis of the output shaft 119 of the prime mover 111. The intermediate gear assembly 117 kinematically couples the input gear assembly 115 to the output gear assembly 116 in a manner that directionally offsets the output gear assembly 116 orthogonal from the rotational axis of the input gear assembly 115. The intermediate gear assembly 117 includes an idler gear 117a.

As shown in FIGS. 1 and 4–6, the transmission 113 extends laterally to a location where the rotational axis of the transmission output gear assembly 116 lies in or near the longitudinal vertical center plane P of the work machine 100. The transmission 113 may also extend vertically downward to a location beneath the main frame 101 so that the rotational axis of the transmission output gear assembly 116 is co-linear, or as near as possible to being co-linear, with the front and rear drive shafts 120, 121. The transmission 113, and in particular the transmission's output gear assembly 116, are preferably coupled to the front and rear drive shafts 120, 121 at a longitudinal position equidistant to the front and rear differentials 109, 110. This arrangement allows the front and rear drive shafts 102, 121 to have substantially equal lengths, thereby ensuring that the drive shaft angles $\theta_f$, $\theta_r$, $\phi_f$, $\phi_r$ are minimized by maximizing the length of the shortest drive shaft. The coupling between the output gear assembly 116 and the front and rear drive shafts can be made through respective front and rear yokes 116a, 116b connected to a transmission output shaft 116c of the output gear assembly 116, seen in FIG. 6. Positioning the transmission 113 at a position equidistant between the front and rear differentials 109, 110 is accomplished by having the transmission 113 intermediate to the prime mover 111 and an associated cooling system 122. Therefore, the prime mover 111, transmission 113, and cooling system 122 are serially aligned in that order relative from the rear end 103 of the work machine 100.

As seen best in FIG. 4, the cooling system 122 is associated with the prime mover 111 and is preferably fixed to the platform 137 that is attached to the main frame 101. The cooling system 122 includes a heat exchanger 123, such as a radiator, that provides fluid-to-air heat exchange for a coolant that circulates throughout a cooling jacket (not shown) to cool the prime mover 111. A fan 125 is provided on a side of the heat exchanger 123 facing the prime mover 111 to force air across the heat exchanger 123 in a known manner. As will be described below with respect to the work machine's hydraulic system, the cooling system 122 also circulates coolant past a hydraulic fluid heat exchanger (not shown) to cool hydraulic fluid used in the work machine 100.

As mentioned previously, the transmission 113 is disposed between the prime mover 111 and the cooling system 122. Therefore, as seen best diagrammatically in FIG. 8, one side of the transmission 113 (e.g., the rear side) is kinematically coupled to the prime mover 111 via the torque converter 118 to drive the front and rear drive shafts 120,121 through the transmission gear assemblies 115,116 and 117. In this manner, the prime mover 111 may be connected and disconnected from the front and rear drive shafts 120 and 121 in a manner that allows the work machine 100 to remain stopped while the engine continues running. Although a torque converter 118 is used, it should be understood that any suitable coupling, such as a friction clutch or the like, may be used to connect the prime mover 111 with the transmission 113.

Further, the other side of the transmission 113 (e.g., the front side) is coupled to the fan 125 of the cooling system 122 through a drive fan assembly 126 so that the prime mover 111 drives the fan 125. Seen in FIG. 6, the coupling of the prime mover with the cooling system 122 occurs through a series of gears 126a and idler gear 117a included in the drive fan assembly 126 which are disposed within the housing 114.

Figure 7:
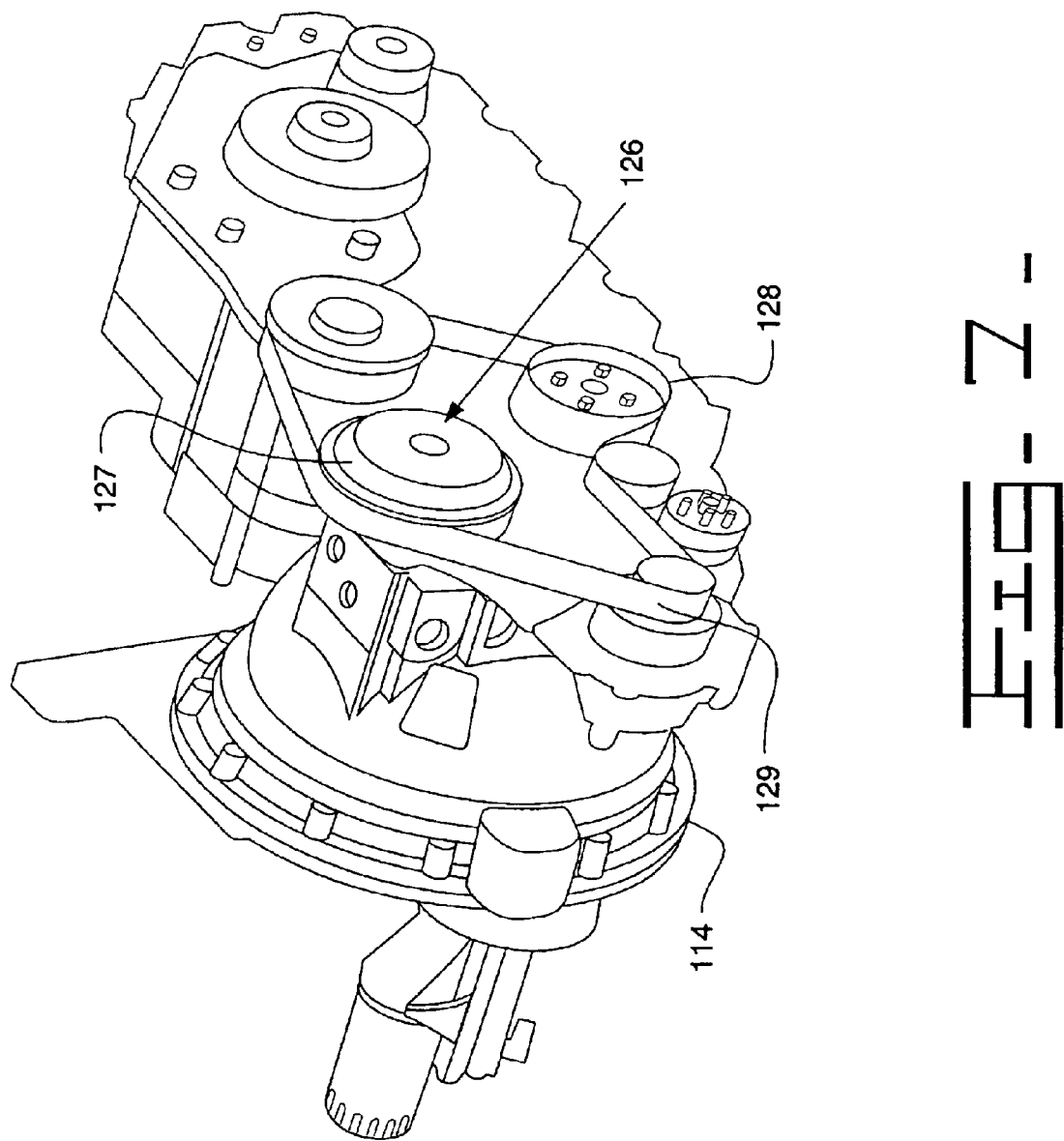
FIG. 7 is a perspective view of the transmission showing the fan drive assembly in accordance with the present invention.

As seen in FIG. 7, the fan drive assembly 126 of the transmission 113 is shown in more detail without the cooling system 122 in order to improve clarity. To maximize the power transmitted to the differentials 109,110 from the prime mover 111, the fan 125 is mechanically driven directly by a fan drive output 127. Preferably, the fan drive output 127 is a pulley rotatably coupled to the prime mover 111 through the transmission 113 and driven by a fan drive input pulley 128 and a belt 129. The prime mover 111 and the fan drive input pulley 128 are connected through the series of gears 126a and idler gear 117a. Also preferably, the rotational axes of the fan drive output 127 and fan drive input 128 are substantially parallel to the rotational axis of the output shaft 119 of the prime mover 111. However, it should be understood that the rotational axes of the fan drive output 127 or fan drive input 128 may be coaxial with the rotational axis of the output shaft 119 of the prime mover 111. While the present invention is described as a direct fan drive assembly 126, other fan mechanisms, such as hydraulic various displacement pump and fluid motor fan drives are within the scope of the present invention.

As described above, the prime mover 111, transmission 113, and cooling system 122 are preferably mounted on or fixed to the platform 137, thereby forming a subassembly or module 139, seen best in FIG. 4, that can be separately assembled and then secured (e.g., bolted) to the main frame 101. As shown in FIG. 1, the module 139 may also include a surrounding enclosure 136.

Referring again to FIGS. 1–3, an operator's cabin 130 is mounted to the main frame 101 and located to a second side 131 of the main frame 101 opposite to the first side 112 at which the prime mover 111 is located. The operator's cabin 130 has a front window 132, a rear window 133, and two side windows 134 and 135 to provide an operator (not shown) with visibility in all directions.

Figure 6:
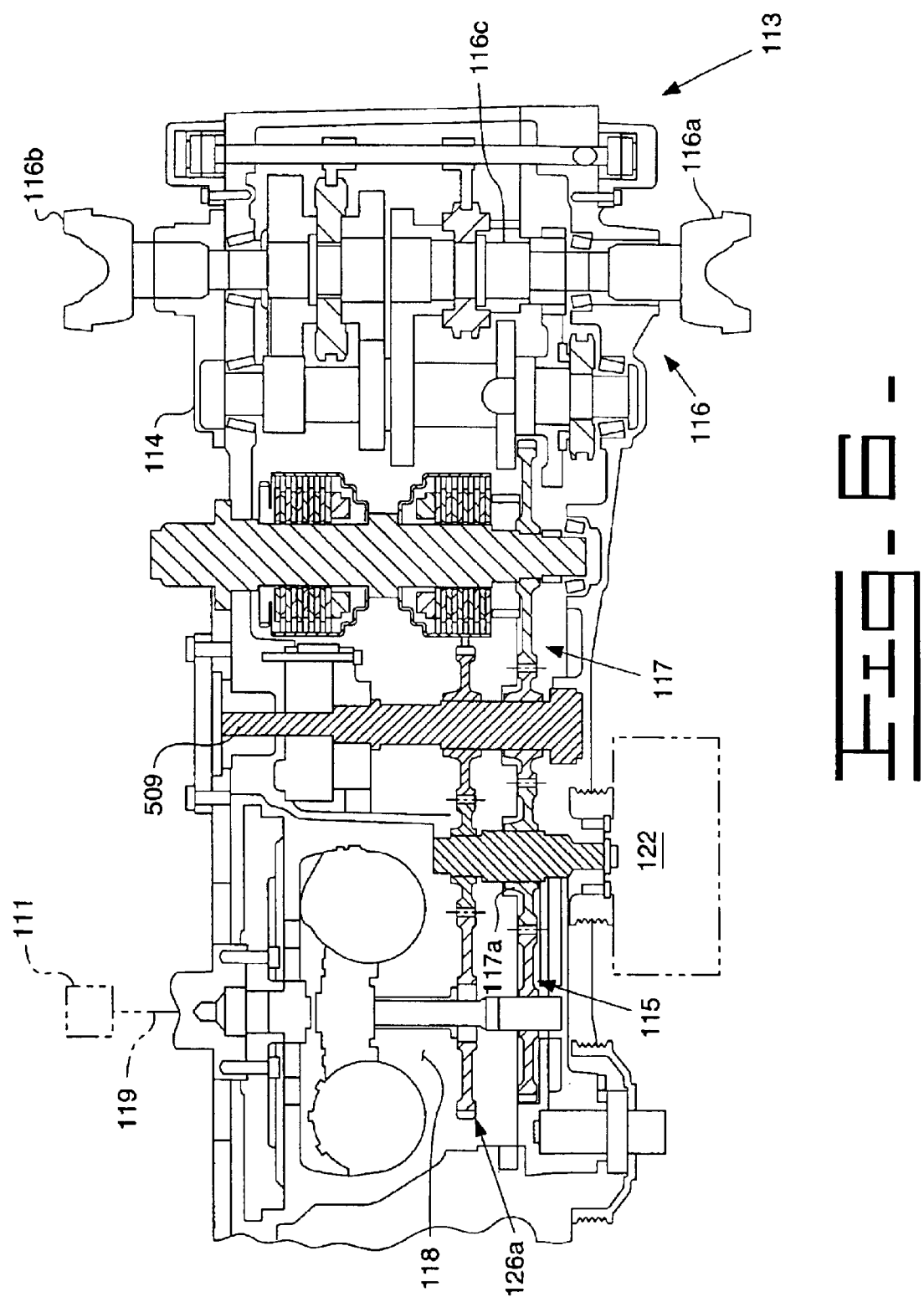
FIG. 6, is a section view of the transmission in accordance with the present invention.

Because the transmission 113 is centered in a longitudinal direction on the work machine 100 and opposes the operator's cabin 130, it is preferable to place the transmission 113 at a relatively low position on the work machine 100 to avoid interference with the operator's cabin 130. In particular, the work machine 100 must have a minimum ground clearance $H_1$ as shown in FIGS. 2 and 3, and the work machine's chassis or main frame 101 must be sufficiently strong to withstand the loads placed on the work machine 100. Therefore, the transmission 113 should preferably be placed within the narrow space $H_2$ provided between the minimum ground clearance $H_1$ and a bottom portion 138 of the main frame 101 that defines a lower limit of the longitudinally extending gap for the boom 201. To accomplish this arrangement, the transmission 113 is preferably made relatively flat or with a slightly curved profile as shown in FIGS. 4, 6, and 7. Since the output of the prime mover 111 is positioned above the drive shafts 120 and 121, the transmission 113 may also be downwardly sloped. Additional gears may be used inside the transmission housing 114 as required to extend the transmission output gear assembly 116 to the drive shafts 120 and 121.

Figure 9:
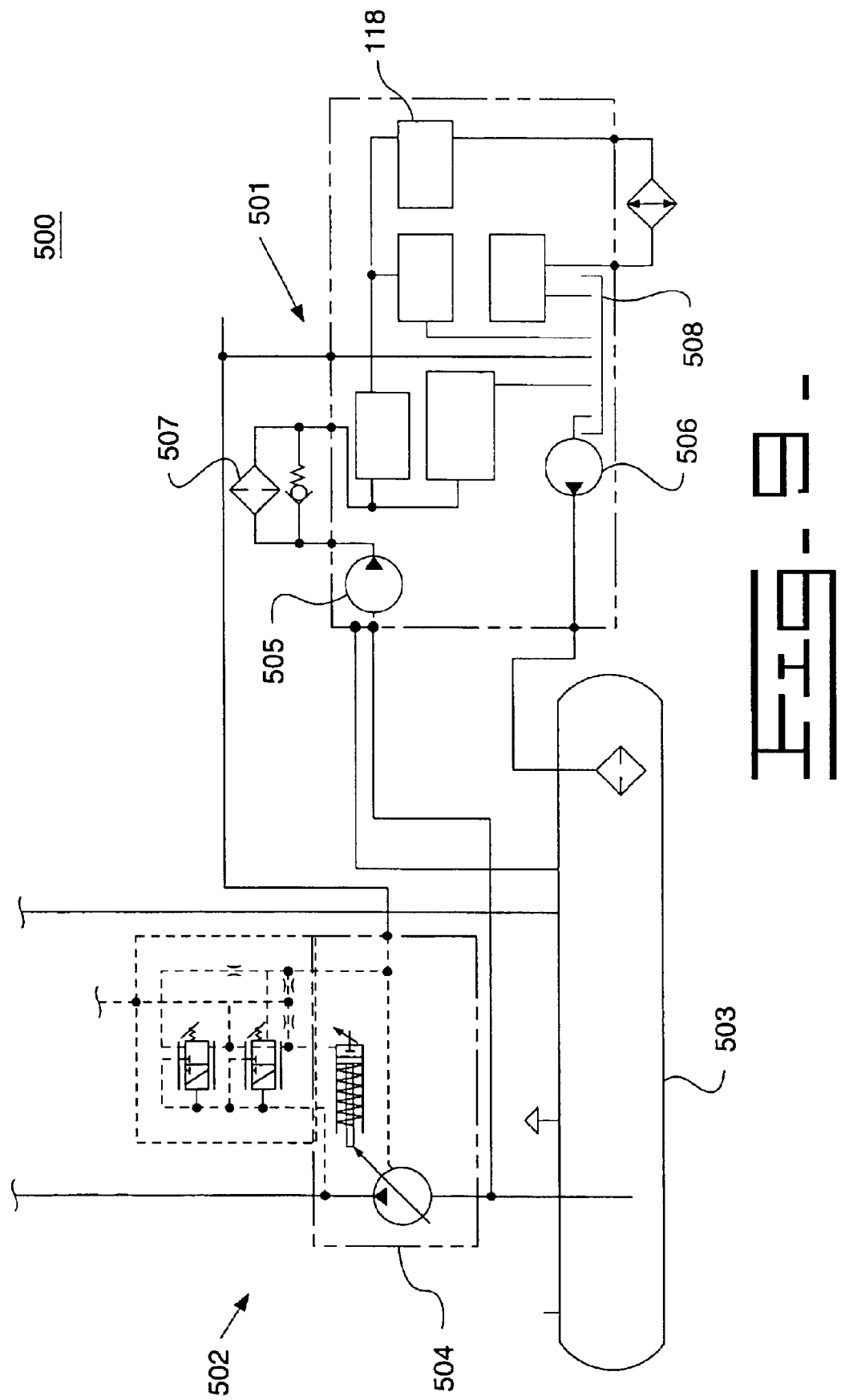
FIG. 9 is a hydraulic flow diagram in accordance with the present invention.

As shown in the hydraulic flow diagram of FIG. 9, the work machine 100 has a common oil system or circuit, generally indicated at 500 that combines both a transmission lubricating oil system 501 and a hydraulic oil system 502. In particular, the common oil system includes a common tank 503 that is shared by the transmission lubricating oil system 501 and the hydraulic oil system 502, a main pump (also referred to as an implement pump) 504 that draws oil from the common tank 503 for providing hydraulic pressure to the work machine's actuating pistons and cylinders (not shown), a charge pump 505 the draws oil from the common tank 503 and feeds it to the torque converter 118 and the transmission 113 and a scavenge pump 506 that draws oil from the transmission sump 508 and returns it to the common tank 503. At some stage in the transmission lubricating oil system 501, for example after the oil passes through the torque converter 118, the oil passes through an oil-to-water heat exchanger (not shown) that transfers heat from the lubricating oil to the coolant in the cooling system 122. Furthermore, an oil filter 507 is included, and is preferably placed at the outlet of the charge pump 505 because of the constant flow of oil, to filter the oil shared by both the transmission lubricating oil system 501 and hydraulic oil system 502. Accordingly, the transmission lubricating oil system 501 functions as the filter and cooling circuit for the oil in the common tank 503. Furthermore, since the transmission 113 is positioned between the prime mover 111 and cooling system 122, additional room is created to position the main or implement pump 504 parallel to the prime mover 111, which are conventionally placed in series, thereby enabling a shorter prime mover 111 and transmission 113. The main or implement pump 504 is driven by a shaft 509, seen best in FIG. 6, that is rotatably coupled to the prime mover 111 through the same series of gears 126a that couple the prime mover 111 with the cooling system 122.

Industrial Applicability

The power train arrangement 90, including the prime mover 111, transmission 113, and cooling system 122 are located on one side of a work machine 100, opposite to the operator's cabin 130. Typically, the prime mover 111, transmission 113, and cooling system 122 are preferably fixed to the platform 137 to form a subassembly or module 139. As discussed above, the operator generally has good visibility in all directions, except the direction in which the prime mover 111, transmission 113, and cooling system 122 obstruct the operator's visibility. Accordingly, the operator's visibility can be substantially improved by lowering the module 139, that is, by lowering the prime mover 111, transmission 113, cooling system 122, and surrounding enclosure 136.

For this reason, the transmission 113 is made relative flat to fit within the narrow space $H_2$ provided between the minimum ground clearance $H_1$ of the work machine 100 and the bottom portion 138 of the main frame 101 that defines a lower limit of the longitudinally extending gap for the boom 201. The narrow space $H_2$ provided for the transmission 113 in its sloped configuration restricts the space available for a traditional splash lubricating system, wherein a sufficient level of fluid is maintained in the transmission's sump 508. To overcome this constraint, the transmission 113 may be dry-sumped and the lubricating oil pumped to a tank as explained below. Using this dry-sumped configuration, the transmission gear assemblies 115–117 are not retarded due to hydrodynamic drag. Furthermore, a dipstick is not required to ensure that a sufficient level of fluid is maintained within the transmission sump 508.

A common oil tank 503 is used to supply oil to both the transmission lubricating oil system 501 and the hydraulic oil system 502. In order for the transmission lubricating oil system 501 and the hydraulic oil system 502 to draw oil from the common tank 503, the common tank 503 must be sufficiently large to provide the required fluid capacity. This is made possible due to the positioning of the transmission 113 intermediate to the prime mover 111 and cooling system 122, which eliminates the need for a transfer gear case, and allows for the positioning of the main or implement pump 505 parallel to the prime mover 111, increasing spatial capabilities for the power train arrangement 90.

The present invention power train arrangement 90 can be used on work machines having different size chassis with little or no alteration to the design of the power train arrangement 90. Because the lateral distance between the front and rear drive shafts 120, 121 and the prime mover 111 can vary depending on the size of the work machine, and in particular the width of the main frame 101, the drive shaft angles can vary by several degrees among different size work machines. However, by placing the transmission 113 between the prime mover 111 and the cooling system 122 so as to substantially center the transmission output gear assembly 116 between the front and rear drive shafts 120, 121, the same subassembly or module 139 design can be used for different size work machines, while maintaining acceptable drive shaft angles. This ability results in reduced drive shaft angles $\theta_f$, $\theta_r$, $\phi_f$, $\phi_r$, thereby minimizing vibration and wear to the power train arrangement 90. In particular, minimizing the drive shaft angles provides added flexibility, since a single power train arrangement that includes the prime mover, transmission, and cooling system can be used for a wider range of work machines and still provide acceptable drive shaft angles. Further, since a plurality of the same modules 139 can be manufactured and then mounted to different size work machines, significant reductions in manufacturing costs may be achieved.

The transmission 113 is compactly designed so that the housing 114 encapsulates all transmission components and is positioned to eliminate the need for a transfer gear case. Furthermore, the transmission 113 is positioned for connection with the prime mover 111 at the rear side and the fan drive assembly 126 at the front side through the series of gears 126a. Therefore, the transmission 113 simultaneously and drivingly connects the front and rear drive shafts 120, 121 and the fan 125 to the prime mover 111 through gearing mechanisms within the housing 114. This ability reduces spatial requirements and connections necessary in typical drive systems wherein the cooling system is directly connected with the prime mover 111. Additionally, the mechanical fan drive assembly 126 is simple, more efficient, and can be easily configured when coupled to the prime mover 111 through the transmission 113.

Another advantage of placing the transmission 113 between the prime mover 111 and the cooling system 122 is that proper distribution of the work machine's weight along the longitudinal axis X—X is obtained to counter the moment force M. The position of the prime mover 111 at a more rearward position than the transmission 113 and cooling system 122 places the greatest proportion of load (weight) farther away from the front end of the work machine 100 to maximize the load carrying capability of the work machine 100 and ensure that the work machine 100 is more stable at maximum carrying loads.

Other aspects, objects and advantages of the invention can be obtained from a study of the drawings, the disclosure and the appended claims.

What is claimed is:

1. A power train arrangement, comprising:
    a prime mover,
    a cooling system; and
    a transmission directly and drivingly connecting the prime mover to the cooling system, the transmission being positioned intermediate the prime mover and the cooling system.

2. The power train arrangement according to claim 1, including a platform with the prime mover, transmission, and cooling system being mounted on the platform to define a module.

3. The power train arrangement according to claim 1, including front and rear drive shafts with the transmission having an input and an output, the transmission being coupled to the prime mover through the input and the transmission being coupled to the front and rear drive shafts through the output.

4. The power train arrangement according to claim 3, including front and rear yokes with the transmission output having a transmission output shaft extending from both a front and rear side of the transmission, the front and rear yokes being connected to the transmission output shaft on respective front and rear sides of the transmission and the front and rear yokes being respectively coupled to the front and rear drive shafts.

5. The power train arrangement according to claim 3, wherein the front drive shaft is substantially equal in length to the rear drive shaft.

6. The power train arrangement according to claim 3, wherein the prime mover has an output shaft with a rotational axis and the transmission input and output each have a rotational axis, the rotational axes of the transmission input and transmission output being substantially parallel with the rotational axis of the prime mover.

7. The power train arrangement according to claim 3, wherein the prime mover has an output shaft with a rotational axis and the transmission input and output each have a rotational axis, the rotational axis of the transmission input being substantially coaxial with the rotational axis of the prime mover and parallel with the rotational axis of the transmission output.

8. The power train arrangement according to claim 6, wherein the transmission includes a fan drive assembly with a fan drive output having a rotational axis and the cooling system includes a fan driven by the fan drive output, the rotational axis of the fan drive output being substantially parallel to the rotational axes of the transmission input and transmission output.

9. The power train arrangement according to claim 6, wherein the transmission includes a fan drive assembly with a fan drive output having a rotational axis and the cooling system includes a fan driven by the fan drive output, the rotational axis of the fan drive output being substantially coaxial with the rotational axis of the transmission input.

10. The power train arrangement according to claim 6, wherein both the transmission input and transmission output are gear assemblies and the transmission includes an intermediate gear assembly that kinematically couples the input gear assembly to the output gear assembly to offset the output gear assembly in a direction orthogonal to the rotational axis of the input gear assembly.

11. The power train arrangement according to claim 1, wherein the prime mover has an output shaft with a rotational axis for coupling with the transmission, the transmission includes a drive assembly with a drive output having a rotational axis and the cooling system is operatively associated with the drive output, the rotational axis of the drive output being substantially parallel to the rotational axis of the output shaft of the prime mover.

12. The power train arrangement according to claim 11, wherein the drive assembly includes a drive pulley and a belt and the cooling system includes a fan, the drive pulley being coupled to the drive output by the belt for directly driving the fan via the drive output.

13. A work machine having front and rear ends, comprising:
    a main frame having first and second sides;
    a prime mover;
    a cooling system; and
    a transmission directly and drivingly connecting the prime mover to the cooling system, the transmission being positioned intermediate the prime mover and the cooling system with the prime mover, the transmission, and the cooling system being disposed on the first side of the main frame.

14. The work machine according to claim 13, wherein the prime mover is disposed rearwardly of the transmission and cooling system relative to the front end of the work machine.

15. The work machine according to claim 13, including an operator's cabin disposed on the second side of the main frame opposite the first side of the main frame.

16. The work machine according to claim 13, including a transmission lubricating oil system and a hydraulic oil system, and a common tank that supplies oil to both the transmission lubricating oil system and the hydraulic oil system.

17. The work machine according to claim 16, wherein the oil supplied to both the transmission lubricating oil system and the hydraulic oil system is cooled by exchanging heat with the cooling system.

18. The work machine according to claim 16, wherein the transmission is dry-sumped and the transmission lubricating oil system includes a charge pump for feeding oil to the transmission and a scavenge pump that draws oil from the transmission and returns the oil drawn from the transmission to the common tank.

19. The work machine according to claim 16, wherein the hydraulic oil system includes an implement pump disposed parallel with the prime mover.

20. The work machine according to claim 13, including a platform on which the prime mover, the transmission, and the cooling system are mounted to form a module;
    a front wheel and a rear wheel;
    a front drive shaft for transmitting a first torque to the front wheel;
    a rear drive shaft for transmitting a second torque to the rear wheel; and
    the transmission includes an input gear assembly and an output gear assembly, the transmission being coupled to the prime mover through the input gear assembly and the transmission being coupled to the front and rear drive shafts through the output gear assembly.

21. The work machine according to claim 20, including a front differential and a rear differential, and wherein the front drive shaft transmits the first torque to the front wheel through the front differential and the rear drive shaft transmits the second torque to the rear wheel through the rear differential.

22. The work machine according to claim 20, wherein the front drive shaft is substantially equal in length to the rear drive shaft.

23. The work machine according to claim 20, including front and rear yokes with the transmission output gear assembly having a transmission output shaft extending from both a front and rear side of the transmission, the front and rear yokes being connected to the transmission output shaft on respective front and rear sides of the transmission.

24. The work machine according to claim 20, wherein the transmission includes a fan drive assembly having a drive pulley, a fan drive output with a rotational axis, and a belt that couples the drive pulley to the fan drive output and the cooling system includes a fan that is driven by the fan drive output, the rotational axis of the fan drive output is substantially parallel to the rotational axis of the output shaft of the prime mover.

25. The work machine according to claim 20, wherein the prime mover has an output shaft with a rotational axis, the input gear assembly has a rotational axis and the output gear assembly has a rotational axis, the rotational axes of the input and output gear assemblies being substantially parallel with the rotational axis of the prime mover.

26. The work machine according to claim 25, wherein the transmission includes an intermediate gear assembly that kinematically couples the input gear assembly to the output gear assembly and that offsets the output gear assembly in a direction orthogonal to the rotational axis of the input gear assembly.

27. The work machine according to claim 20, wherein the transmission includes a torque converter, and wherein the input gear assembly is coupled to the prime mover through the torque converter.

28. The work machine according to claim 27, including a common housing that encloses the torque converter, input gear assembly and output gear assembly of the transmission.

29. The work machine according to claim 13, wherein the work machine is a telescopic material handler including:
    two front wheels disposed on opposite sides of the main frame;
    two rear wheels disposed on opposite sides of the main frame;
    a front drive shaft for transmitting a first torque to at least one of the two front wheels;
    a rear drive shaft for transmitting a second torque to at least one of the two rear wheels;
    an operator's cabin disposed on a second side of the main frame opposite a first side of the main frame;
    a telescopic boom centrally disposed between the operator's cabin on the second side of the main frame and the prime mover, the transmission, and the cooling system on the first side of the main frame, the telescopic boom pivotally connected at a rear end of the main frame and having a distal end extending past a front end of the main frame, the telescopic boom adapted to carry a load at its distal end; and
    input and output gear assemblies disposed within the transmission, the transmission being coupled to the prime mover through the input gear assembly and the front and rear drive shafts being coupled to the transmission through the output gear assembly so that the prime mover is distanced farther from the distal end of the telescopic boom than the transmission and cooling system.

30. The work machine according to claim 29, wherein the transmission is positioned within a space defined at a bottom portion of the main frame above a minimum ground clearance.

31. A work machine having front and rear ends, comprising:
    a main frame;
    a platform;
    a prime mover, transmission and cooling system connected to the platform to define a module releasably connected to the main frame, the transmission directly and drivingly connecting the prime mover to the cooling system so that the prime mover is positioned rearwardly from the transmission and cooling system in relation to the front end of the work machine;
    a front wheel and a rear wheel;
    a front drive shaft coupled to the transmission for transmitting a first torque to the front wheel, the front drive shaft having a predetermined length; and
    a rear drive shaft coupled to the transmission for transmitting a second torque to the rear wheel, the rear drive shaft having a predetermined length equal to the predetermined length of the front drive shaft.

32. The work machine according to claim 31, wherein the transmission has front and rear sides and the interconnection between the prime mover, transmission and cooling system includes that the transmission is coupled at the front side to the cooling system and is coupled at the rear side to the prime mover with the transmission positioned between the prime mover and the cooling system.

33. A method of manufacturing a plurality of work machines, including a first work machine having a first main frame and a second work machine having a second main frame, wherein the second main frame is larger than the first main frame, comprising the steps of:

providing two prime movers, two transmissions, two cooling systems, and two platforms;

assembling a first module and a second module, each of the first and second modules including one of the two prime movers, one of the two transmissions, and one of the two cooling systems mounted to a respective one of the two platforms, wherein for each of the first and second modules the transmission directly and drivingly connects the respective prime mover to the respective cooling system and is disposed intermediate to the prime mover and the cooling system; and mounting the first module to the first main frame and mounting the second module to the second main frame.

* * * * *